US 8,347,283 B2

(12) United States Patent
Stich et al.

(10) Patent No.: US 8,347,283 B2
(45) Date of Patent: Jan. 1, 2013

(54) SYSTEM AND METHOD FOR AUTOMATIC INSTALLATION AND MAINTENANCE OF HARDWARE AND SOFTWARE IN A DISTRIBUTED COMPUTER SYSTEM

(75) Inventors: Christian M. Stich, Hirschberg-Leutershausen (DE); Marcel Dix, Mannheim (DE); Peter Johann Walther Schemat, Västeras (SE)

(73) Assignee: ABB Research Ltd., Zurich (CH)

( * ) Notice: Subject to any disclaimer, the term of this patent is extended or adjusted under 35 U.S.C. 154(b) by 1520 days.

(21) Appl. No.: 11/826,667

(22) Filed: Jul. 17, 2007

(65) Prior Publication Data
US 2008/0028394 A1 Jan. 31, 2008

(30) Foreign Application Priority Data
Jul. 31, 2006 (DE) .......................... 10 2006 035 890

(51) Int. Cl.
G06F 9/44 (2006.01)
G06F 9/445 (2006.01)
(52) U.S. Cl. ......... 717/174; 717/168; 717/177; 717/178
(58) Field of Classification Search .................. 717/173, 717/178
See application file for complete search history.

(56) References Cited

U.S. PATENT DOCUMENTS

| 5,742,829 | A | * | 4/1998 | Davis et al. | 717/178 |
|---|---|---|---|---|---|
| 6,009,274 | A | * | 12/1999 | Fletcher et al. | 717/173 |
| 7,003,767 | B2 | * | 2/2006 | Larkin | 717/172 |
| 7,124,409 | B2 | * | 10/2006 | Davis et al. | 717/178 |
| 7,185,335 | B2 | * | 2/2007 | Hind et al. | 717/176 |
| 7,496,911 | B2 | * | 2/2009 | Rowley et al. | 717/174 |
| 7,506,338 | B2 | * | 3/2009 | Alpern et al. | 717/177 |
| 7,549,149 | B2 | * | 6/2009 | Childress et al. | 717/177 |
| 7,577,948 | B2 | * | 8/2009 | Zomaya et al. | 717/168 |
| 7,624,393 | B2 | * | 11/2009 | Egan et al. | 717/173 |
| 7,950,010 | B2 | * | 5/2011 | Goger et al. | 717/178 |
| 8,006,241 | B2 | * | 8/2011 | Dias | 717/174 |
| 2002/0174422 | A1 | * | 11/2002 | Kelley et al. | 717/178 |
| 2003/0009754 | A1 | * | 1/2003 | Rowley et al. | 717/177 |
| 2003/0035005 | A1 | | 2/2003 | Kodosky et al. | |
| 2004/0060045 | A1 | * | 3/2004 | Hind et al. | 717/174 |
| 2004/0088700 | A1 | * | 5/2004 | Lee et al. | 717/178 |
| 2005/0066019 | A1 | * | 3/2005 | Egan et al. | 709/223 |
| 2006/0037012 | A1 | * | 2/2006 | Zomaya et al. | 717/168 |

(Continued)

OTHER PUBLICATIONS

G. E. Tompkins, "Charateristics of Application Software Maintenance", 1978 ACM, pp. 466-471, <http://dl.acm.org/citation.cfm?id=359522>.*

(Continued)

Primary Examiner — Thuy Dao
Assistant Examiner — Cuong V Luu
(74) Attorney, Agent, or Firm — Buchanan Ingersoll & Rooney PC

(57) ABSTRACT

A system and a method are disclosed for automatic installation and maintenance of hardware and/or software in the system nodes of a distributed computer system, in particular in a distributed automation system, comprising a system installation and/or system maintenance tool that can be activated from every system node of the distributed system. The system installation and/or system maintenance tool (WZ) selects a software package and/or a functional component, and automatically executes the maintenance steps of the selected software package and/or of the selected functional component as regards the distribution, installation and/or configuration of the software package and/or of the selected functional component in a defined sequence on the system nodes (SK) of the distributed system.

17 Claims, 2 Drawing Sheets

U.S. PATENT DOCUMENTS

| | | | |
|---|---|---|---|
| 2006/0168581 A1* | 7/2006 | Goger et al. | 717/174 |
| 2006/0195839 A1* | 8/2006 | Lin et al. | 717/174 |
| 2008/0301669 A1* | 12/2008 | Rao et al. | 717/173 |
| 2009/0113414 A1* | 4/2009 | Hamilton | 717/173 |
| 2009/0300596 A1* | 12/2009 | Tyhurst et al. | 717/173 |
| 2010/0131084 A1* | 5/2010 | Van Camp | 700/86 |

OTHER PUBLICATIONS

Meir M. Lehman, "Programs, Life Cycles, and Laws of Software Evolution", 1980 IEEE, pp. 1060-1076, <http://ieeexplore.ieee.org/stamp/stamp.jsp?tp=&arnumber=1456074>.*

William C. Cave, "Controlling the Software Life Cycle—The Project Management Task", Jul. 1978 IEEE, pp. 326-334, <http://ieeexplore.ieee.org/stamp/stamp.jsp?tp=&arnumber=1702542>.*

M M Lehman, "Implications of Evolution Metrics on Software Maintenance", 1998 IEEE, 10 pages, <http://ieeexplore.ieee.org/stamp/stamp.jsp?tp=&arnumber=738510>.*

Barry C. De Roze, "The Software Life Cycle—A Management and Technological Challenge in the Department of Defense", Jul. 1998 IEEE, pp. 309-318, <http://ieeexplore.ieee.org/stamp/stamp.jsp?tp=&arnumber=1702540>.*

Clyde Chittister, "Risk Associated with Software Development: A Holistic Framework for Assessment and Management", Jun. 1993 IEEE, pp. 710-723, <http://ieeexplore.ieee.org/stamp/stamp.jsp?tp=&arnumber=256544>.*

* cited by examiner

SYSTEM AND METHOD FOR AUTOMATIC INSTALLATION AND MAINTENANCE OF HARDWARE AND SOFTWARE IN A DISTRIBUTED COMPUTER SYSTEM

RELATED APPLICATIONS

This application claims priority under 35 U.S.C. §119 to German Application 10 2006 035 890.2 filed in Germany on Jul. 31, 2006, the entire contents of which are hereby incorporated by reference in their entireties.

TECHNICAL FIELD

The disclosure relates to a system and a method for automatic installation and maintenance of hardware and/or software in the system nodes of a distributed computer system, e.g., in a distributed automation system.

BACKGROUND INFORMATION

Distributed computer systems, in particular process control systems, are composed of a multiplicity of distributed components that are interrelated, for example in client-server relationships. The components of the distributed system, each of which provide one or more functionalities, are distributed over a plurality of computers or data processing devices, also referred to below as system nodes. Examples of system nodes used in the automation system are operator stations, engineering stations, archiving stations, control equipment comprising processing stations, and input and output units. The system nodes are connected together via one or more physical networks.

Operating systems, user software, control programs and various functional components of the process control system are installed on the system nodes, with the individual system nodes, including their various functional components, being dependent on each other in a variety of ways.

There are a range of tools for installing and maintaining hardware and/or software in a distributed automation system, which, for example, install new systems, system updates, system upgrades to a higher version and system expansions incorporating additional functionalities, or which perform system analyses. These processes, however, do not include functionalities distributed over a plurality of system nodes.

The current approach to software installation and maintenance assumes that computers are functionally self-contained. For installation and maintenance tasks on distributed systems, it is usually necessary to execute different installation and configuration steps separately in a specific, predefined sequence on every system node. At present, there is no tool that manages on a system-wide basis the system updates, system upgrades, system expansions or system analyses, also known as life cycle management, of a distributed system.

In addition, existing procedures only handle individual computers in a distributed system independently of each other.

Further disadvantages of today's system installation procedures and system maintenance procedures relate to the fact that in order to install and maintain the new software, the user must interact with every desktop, and must often cover large distances between the individual computers, for example by means of a remote maintenance console.

SUMMARY

A system is disclosed for automatic installation and maintenance of hardware and/or software in the system nodes of a distributed system, whereby the aforementioned disadvantages are avoided and system installation and system maintenance can be performed in an automated manner.

According to the invention, the system for automatic installation and maintenance of hardware and software in the system nodes of a distributed system, e.g., in a distributed automation system, comprises a system installation and/or system maintenance tool that can be activated from every system node of the distributed system.

The system installation and/or system maintenance tool selects a maintenance activity, e.g., a software package and/or a functionality. The selected functionality is, for example, a set of operating station functions or the interfacing of a controller in a process control system.

The selectable software packages are elements of life cycle management activities such as new system installations, system updates, system upgrades to a higher version, system expansions incorporating additional functionalities or system analyses.

The system installation and/or system maintenance tool automatically executes the relevant maintenance steps of the selected maintenance activity in a defined sequence on the various system nodes of the distributed system. The maintenance steps include, e.g., the distribution, installation and configuration of the selected software packages.

In an advantageous embodiment of the system according to the invention, the system installation and/or system maintenance tool comprises a display module, which stores the changes in the distributed system that have been produced by the software packages and/or functional components or applications newly installed and/or configured by the system installation and/or system maintenance tool, displays these changes and/or provides them for further processing, for example for output on a printer.

The display module is additionally provided also for documenting changes to the network structure, for instance produced by adding, removing or replacing operator stations, engineering stations, archiving computers, control equipment comprising processing stations, input and output units and communications interfaces, and/or changes to the individual hardware components such as replacement of graphics cards or hard disks.

In a further advantageous embodiment of the system according to the invention, a test module is provided, which tests that the installation and configuration of the distributed software packages and/or functional components are fully implemented on the individual system nodes, and/or creates a system status report. In addition, it is provided that the test module also tests the interdependencies of the software packages and/or functional components between the system nodes as regards the existence of the necessary dependent components in the distributed system.

A further advantage of the system according to the invention is that after the automatic installation and/or configuration of the software packages and functional components in the entire distributed system, the system is immediately operational again.

In an exemplary method, a system installation and/or system maintenance tool can be activated from any system node of the distributed system.

A maintenance activity, e.g., a software package and/or a functionality, is selected by a system installation and/or system maintenance tool. The selected software package and/or the selected functional component are automatically distributed, installed and/or configured in a defined sequence on the system nodes.

In an advantageous embodiment of the invention, the installation and configuration of the selected and distributed software packages and/or functional components are automatically tested and evaluated to assess whether they are operational, and/or a status report on the entire distributed system is created, said activities being performed by a test module.

In addition to automatic installation and configuration of the software and hardware on the entire distributed system without additional external interventions, the method according to the invention can also be used to uninstall existing software.

It is further provided that in redundant distributed systems, the method according to the invention is used to perform an automatic installation and maintenance of the hardware and/or software in the system nodes of one of the redundant system parts even during their operation, with guaranteed functionality of the entire system being maintained.

The exemplary system and method can be employed in a distributed automation system, where the system nodes include, for example, operator stations, engineering stations, archiving stations, control equipment comprising processing stations, input and output units and/or communications interfaces.

BRIEF DESCRIPTION OF THE DRAWINGS

The invention and advantageous embodiments and improvements of the invention shall be explained and described in more detail with reference to the exemplary embodiment shown in FIGS. 1 and 2, in which.

DETAILED DESCRIPTION

Figure 1:
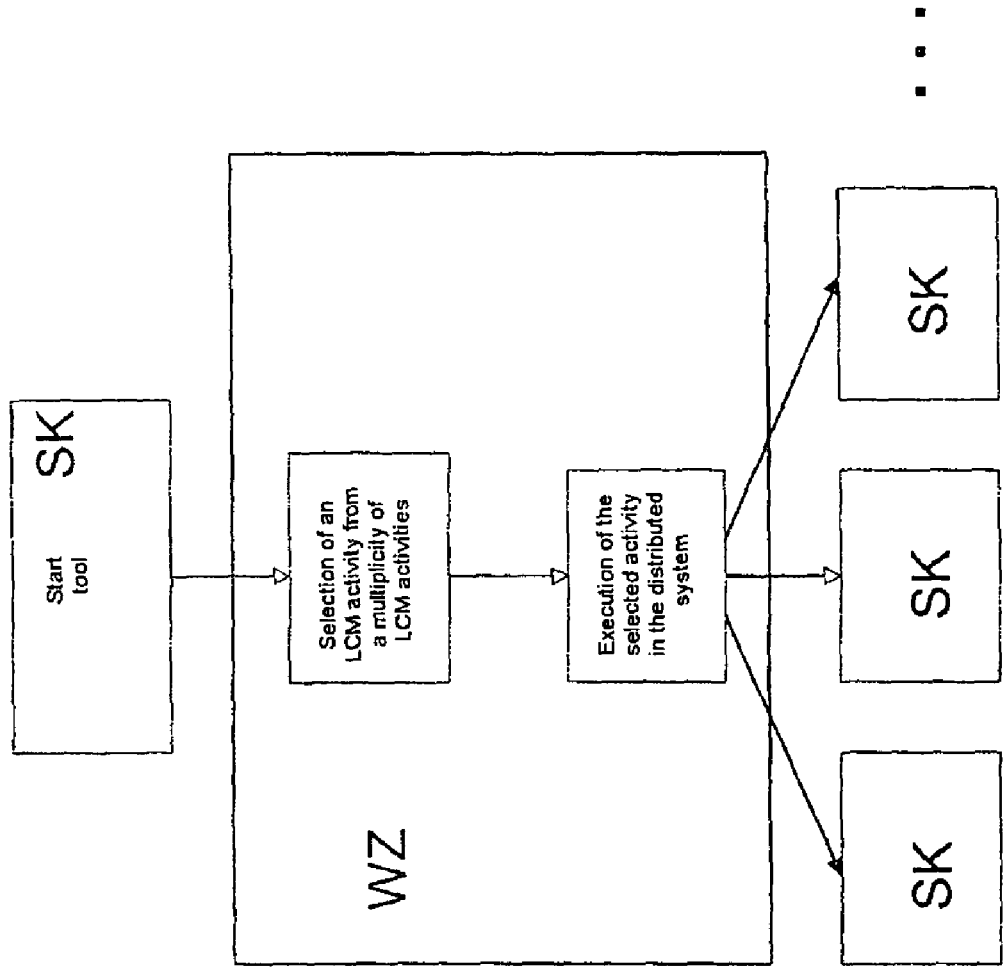
FIG. 1 shows an embodiment of the system according to the invention for automatic installation and maintenance of hardware and/or software in the system nodes of a distributed automation system.

FIG. 1 shows an embodiment of the system according to the invention for automatic installation and maintenance of hardware and/or software in the system nodes SK of a distributed automation system, implemented as a process control system, over its entire life cycle, where various functional components such as an operating system or user software are stored in the system nodes SK. The individual system nodes SK including their various functional components are dependent on each other in a variety of ways.

According to the invention, the system for automatic installation and maintenance of hardware and software in the system nodes SK of the process control system comprises a system installation and/or system maintenance tool WZ that can be activated from any system node SK of the process control system.

The system installation and/or system maintenance tool WZ automatically selects a life cycle management activity LCMA from an available set of predefined life cycle management activities LCMA.

For this purpose, the various life cycle management activities LCMA are represented by different predefined processes in the system installation and/or system maintenance tool WZ. The processes describe the necessary installation and configuration steps, which are to be performed in a specific sequence on specific system nodes SK of the process control system.

The system installation and/or system maintenance tool WZ automatically executes the necessary steps for distribution, installation and configuration of the life cycle management activity LCMA in a defined sequence on the various system nodes SK of the process control system. The distribution of the selected life cycle management activity LCMA and execution of the relevant installation and configuration steps can be started and controlled from any computer or system node SK of the process control system.

Since the installation and configuration steps are to be executed on a plurality of different system nodes SK, the system installation and/or system maintenance tool WZ controls the process for the system-wide execution of the predefined processes on the various system nodes SK of the process control system.

If a specific process step within the process is to be performed on a different system node SK, the system installation and/or system maintenance tool WZ activates this system node SK to execute the process step or executes the relevant process step itself on the remote system node SK.

The process described above thus ensures across the system that the installation and configuration steps are performed in the correct sequence on the various computers.

Figure 2:
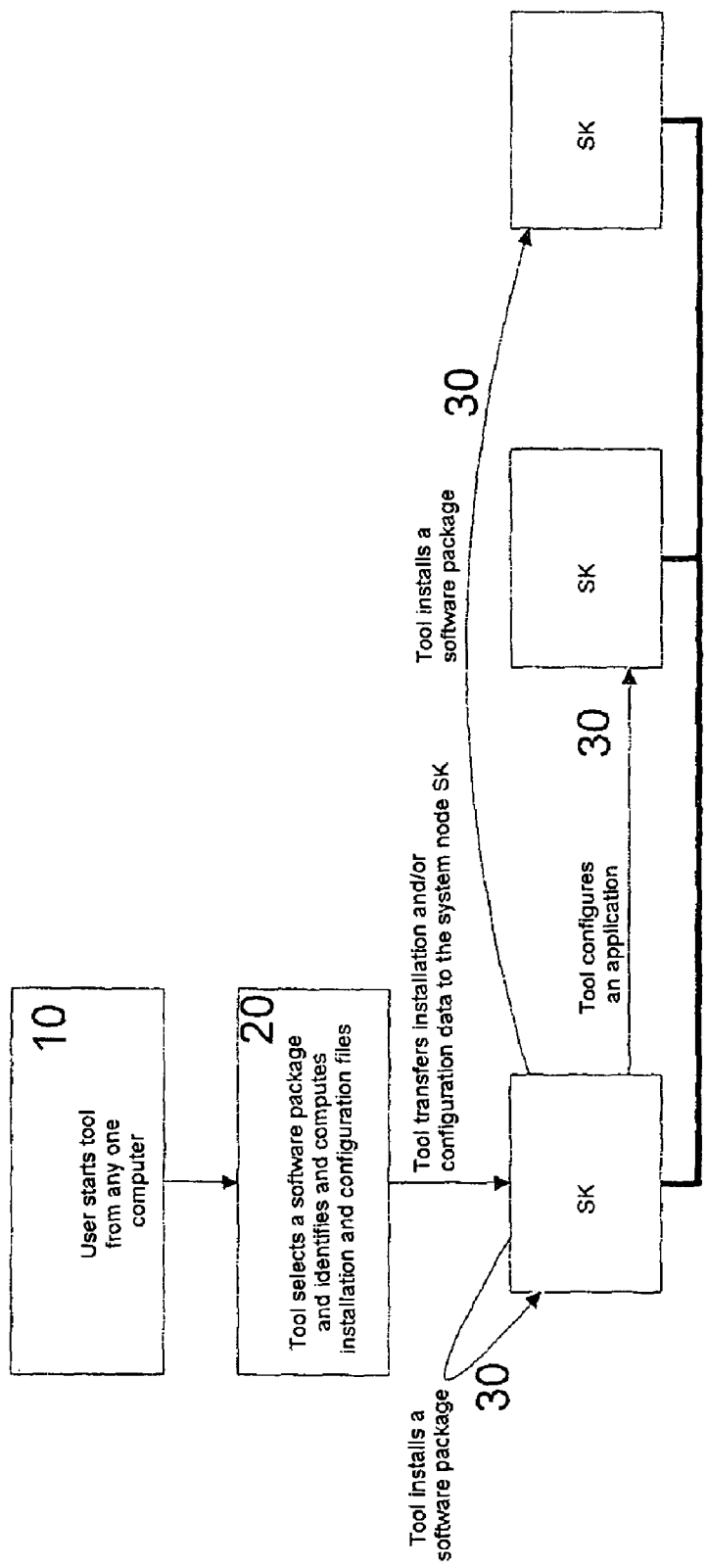
FIG. 2 shows an example of a method procedure for automatic installation and maintenance of hardware and/or software in the system nodes of a distributed automation system.

FIG. 2 shows an example of a method procedure for automatic installation and maintenance of software in the data-processing devices SK of a distributed automation system.

The method according to the invention specifies a number of steps by which the automatic installation and maintenance of the software in the system nodes SK of the distributed automation system are executed.

In a first step 10, the system installation and/or system maintenance tool WZ is started from a system node SK of the distributed automation system.

After the system installation and/or system maintenance tool WZ is started, a life cycle management activity LCMA is automatically selected from an available set of predefined life cycle management activities LCMA in a second step 20.

The selected life cycle management activity LCMA is automatically executed in a third step 30 on the system nodes SK of the automation system in the correct sequence according to a predefined process of the respective life cycle management activity LCMA, where the individual process steps for distribution, installation and configuration depend on the life cycle management activity LCMA to be executed at that time.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for automatic installation and maintenance of hardware and/or software in the system nodes of a process control system that includes a system maintenance tool, the method comprising:

activating the system maintenance tool from any system node of the process control system;

selecting a software package and/or a functional component via the system maintenance tool, wherein the selected software package and/or the selected functional component are elements of predefined life cycle arrangement activities;

executing automatically maintenance steps of the selected software package and/or of the selected functional component with regard to the distribution, installation and/or configuration of the software package and/or of the selected functional component in a defined sequence on the system nodes of the process control system;

testing the installation and configuration of the software packages and/or functional components to assess whether they are fully implemented on the individual system nodes of the distributed system, and/or testing interdependencies of the software packages and/or functional components between the system nodes of the distributed system; and creating a system status report comprising an indication of a status of the tested installation and configuration and/or an indication of a status of the tested interdependencies.

2. The method according to claim 1, wherein life cycle management activities, such as new system installations, system updates, system upgrades to a higher version, system expansions incorporating additional functionalities or system analyses, are executed by the selected software package and/or the selected function component.

3. The method according to claim 1, wherein the life cycle management activities are represented by different predefined processes, and the processes describe the installation and configuration steps, which are to be performed in a specific sequence on the system nodes of the process control system.

4. The method according to claim 3, comprising:
controlling the process for the system-wide execution of the predefined processes on various system nodes in the process control system are controlled by the system maintenance tool.

5. The method according to claim 1, comprising:
connecting the system maintenance tool to a display module, which stores, displays and/or provides for further processing, changes in the process control system.

6. The method according to claim 1, comprising:
documenting changes to the hardware, which includes adding, removing or replacing system nodes or hardware components, by the system maintenance tool.

7. The method according to claim 1, wherein said testing and creating activities are performed by a test module.

8. The method according to claim 4, comprising
connecting the system maintenance tool to a display module, which stores, displays and/or provides for further processing, changes in the process control system.

9. The method according to claim 5, comprising:
documenting changes to the hardware, which includes adding, removing or replacing system nodes or hardware components, by the system maintenance tool.

10. A system for automatic installation and maintenance of hardware and/or software in system nodes of a process control system, comprising:
a processor; and
a memory storing executable instructions enabling the processor to implement:

a system maintenance tool that can be activated from every system node of the process control system, wherein the system maintenance tool selects a software package and/or a functional component, and automatically executes maintenance steps of the selected software package and/or of the selected functional component with regard to the distribution, installation and/or configuration of the software package and/or of the selected functional component in a defined sequence on the system nodes of the process control system, wherein the selected software package and/or the selected functional component are elements of predefined life cycle management activities; and a test module configured to:
test the installation and configuration of the software packages and/or functional components to assess whether they are fully implemented on the individual system nodes of the distributed system, and/or test interdependencies of the software packages and/or functional components between the system nodes of the distributed system; and
create a system status report comprising an indication of a status of the tested installation and configuration and/or an indication of a status of the tested interdependencies.

11. The system according to claim 10, wherein the life cycle management activities are new system installations, system upgrades to a higher version, system expansions incorporating additional functionalities or system analyses.

12. The system according to claim 11, wherein the life cycle management activities are represented by different predefined processes in the system maintenance tool, and the processes describe installation and configuration steps, which are to be performed in a specific sequence on the system nodes of the process control system.

13. The system according to claim 12, wherein the system maintenance tool controls the process for system-wide execution of predefined processes on the various system nodes in the process control system.

14. The system according to claim 10, wherein the system maintenance tool interacts with a display module, which stores changes in the process control system that have been produced by the software packages and/or functional components newly installed and/or configured, displays these changes and/or provides them for further processing.

15. The system according to claim 10, wherein the system maintenance tool documents changes to network structure and/or to individual hardware components.

16. The system according to claim 10, wherein the system nodes are data-processing devices such as operator stations, engineering stations, archiving stations, control equipment comprising processing stations, input and output units and/or communications interfaces.

17. The system according to claim 10, wherein after the automatic installation and/or configuration of the software packages and/or functional components, the process control system is immediately operational again.

* * * * *